Patented Aug. 15, 1944

2,356,073

UNITED STATES PATENT OFFICE 2,356,073

REACTION PRODUCTS OF ALIPHATIC ALCOHOLS AND TERPENE-PHOSPHORUS SULPHIDE

Robert L. May, Chicago, Ill., assignor to Sinclair Refining Company, New York, N. Y., a corporation of Maine No Drawing. Application July 14, 1943, Serial No. 494,689

5 Claims. (Cl. 260—125)

This invention relates to a novel composition of matter and more particularly to a new class of compounds resulting from the reaction of an alcohol with a condensation product of turpentine and a phosphorus sulphide.

In my co-pending application Serial No. 494,688, filed July 14, 1943, I have described and claimed a new class of resin-like materials resulting from the condensation of certain phosphorus sulphides, including phosphorus pentasulphide, with a terpene such as turpentine. I have now discovered that the condensation products of turpentine and phosphorus pentasulphide, therein described, react with alcohols, more particularly aliphatic alcohols, to form a new class of compounds of marked commercial value particularly as addends in lubricating oils, as more fully described in my co-pending application Serial No. 494,690, filed July 14, 1943, and as intermediate materials in the synthesis of other valuable products.

The characteristics of the product of my present invention vary somewhat depending upon the characteristics of the turpentine-$P_2S_5$ condensation product, and the nature and proportions of the alcohol used in its production. Generally, these compounds are relatively acidic and are highly soluble in mineral oils.

The invention will hereinafter be illustrated by specific examples of my new products. Since the characteristics of the products are to a substantial extent affected by the characteristics of the turpentine-$P_2S_5$ condensation product used in its preparation, description of the preparation of the condensation products used is included in these specific examples. Accordingly, the description of the preparation of the various products will include two steps, i. e., the preparation of the intermediate material and the preparation of the final product. However, it will be understood that the compounds of my present invention may be prepared from a previously prepared turpentine-$P_2S_5$ condensation product.

In the preparation of the intermediate condensation products for use in the preparation of the products of my present invention, the ratio of turpentine to $P_2S_5$ used is with advantage within the range from approximately 1:1 to about 3 parts of turpentine to 1 part of $P_2S_5$. Where ratios higher than about 3:1 are used, the product has been found to contain considerable unreacted turpentine. Ratios of about 3:2 have generally been found to give particularly desirable results.

The reaction of turpentine with $P_2S_5$ is highly exothermic and proceeds spontaneously after being initiated by slight heating. A desirable method of effecting the reaction is to heat the turpentine in a vessel to about 200° F. or slightly higher and then, without further heating, slowly stirring in the phosphorus pentasulphide in the powdered form. The heat of the reaction is great, and, consequently, the addition should be made slowly so as to avoid the possibility of the reaction's becoming uncontrollable. The product of my present invention is favorably affected by the use of a turpentine-$P_2S_5$ condensation product in the preparation of which the temperature during the mixing is not permitted to exceed about 250° F., although higher temperatures are permissible.

After the addition is completed, it is usually necessary to apply heat externally to complete the reaction. The temperature during this last stage is preferably maintained at about 300° F., though temperatures of about 200 to 400° F. may be employed. The second stage should be continued until all of the $P_2S_5$ is dissolved. The material thus prepared is a viscous liquid at elevated temperatures which solidifies on cooling to room temperature.

In general, compounds of the class of my present invention may be prepared by adding the alcohol gradually to the turpentine-$P_2S_5$ condensation product, advantageously at a temperature of about 250° F. In reacting the alcohol with the turpentine-$P_2S_5$ condensation product, very little heat is evolved. After the alcohol has been added, the mixture is maintained at an elevated temperature, advantageously about 200–220° F., for about 2 hours with stirring. The nature and proportions of the alcohol to be added may be varied over a considerable range, depending upon the particular characteristics of the product desired. The proportion of alcohol used is also dependent upon the ratio of turpentine to $P_2S_5$ used in the preparation of the intermediate material. Particularly desirable results have been obtained using about 2 moles of $P_2S_5$, 5 moles turpentine and 3 moles alcohol, assuming the molecular weight of the turpentine to be 136.

I cannot at present definitely identify this novel class of materials by chemical formula. However, in the preparation of the turpentine-$P_2S_5$ condensation product used in the preparation of these new materials, I have found it desirable that no unreacted $P_2S_5$ be present as in the treatment of the turpentine-$P_2S_5$ condensation product with the alcohol, any unreacted $P_2S_5$ present has been found to react with the alcohol to form esters of thiophosphoric acid.

The following specific examples of various members and the procedure by which they have been successfully prepared are given as illustrative of the group:

Example I

In a 3-liter, 3-necked flask equipped with a stirrer, a thermometer and a funnel, there was placed 1360 grams (10 moles) of steam-distilled wood turpentine. The turpentine was heated to about 200° F., by means of an electric heater placed under the flask. The heat was then turned off, the stirrer started and 888 grams (4 moles) of powdered phosphorus pentasulphide was added portionwise. About 30 to 40 gram portions of the sulphide were added at first and, after about half the sulphide was added, the portions were increased to about 100 grams. The temperature was controlled by the rate of addition of the phosphorus pentasulphide so that it did not exceed 250° F. When all the phosphorus pentasulphide had been added and the exothermic reaction had stopped, as shown by a dropping of the temperature, the heater was again turned on and the mixture stirred and heated slowly to 300° F., and maintained at that temperature for about 4 hours. At the end of this period all of the phosphorus pentasulphide was dissolved and the product was a viscous amber-colored liquid. The heater was then turned off and the mixture allowed to cool to 250° F., and, while at this temperature, 780 grams (6 moles) of capryl alcohol (octanol-2) was added slowly over a period of 30 minutes. The heater was again turned on and the temperature held at 200–220° F. for 2 hours.

The resultant product was found by analysis to have an acid number of 71, a saponification number of 162.9 and to contain 8.07% phosphorus and 20.3% sulphur, each by weight.

Example II

In a 5-liter flask, similar to that used in Example I, there was placed 2040 grams (15 moles) of steam-distilled wood turpentine. The turpentine was then heated to about 200° F., by means of an electric heater placed under the flask. Thereafter, the heat was turned off and 1332 grams (6 moles) of powdered phosphorus pentasulphide was added portionwise and stirred into the turpentine. The first half of the phosphorus pentasulphide was added in about 50 gram portions and the second half in about 100–150 gram portions. The rate of addition was controlled so that the temperature of the reaction did not exceed 300° F. When the last of the sulphide was added and the heat of the reaction began to subside, the heater was again turned on and the reaction mixture stirred and heated to about 300° F., and maintained at this temperature for about 4 hours while stirring. At the end of this period, the phosphorus pentasulphide was dissolved. The heater was then turned off, the contents of the flask permitted to cool to 250° F., and, while at this temperature, 1170 grams (9 moles) of capryl alcohol was slowly added. After all the alcohol had been added, the temperature of the mixture was maintained at 200 to 220° F., for about 2 hours.

The product resulting from the above-described procedure was found by analysis to have an acid number of 64.9, a saponification number of 156.8 and to contain 8.2% phosphorus and 20.8% sulphur by weight.

Example III 680 grams (5 moles) of turpentine was placed in a 2-liter flask such as previously described and stirred while being heated to 225° F. 444 grams of powdered phosphorus pentasulphide was then added to the turpentine at such a rate that the temperature did not rise above 250° F. After all the sulphide had been added, the temperature of the mixture was raised to 300° F. and maintained at that temperature for about 3 hours, at the end of which period all of the phosphorus pentasulphide was dissolved. The mixture was then permitted to cool to 250° F. and 264 grams of "Pentasol," a commercial mixture of amyl alcohols, was added. The temperature was then maintained at 220° F. for an additional hour.

The product was found by analysis to have an acid number of 74.6 and a saponification number of 181.1 and to contain 9.23% phosphorus and 21.57% sulphur by weight.

Example IV

A 3-liter, round-bottomed flask, fitted with a stirrer, was charged with 680 grams of turpentine. The turpentine was heated to 200° F., the heating discontinued and 444 grams of powdered phosphorus pentasulphide was added, with stirring, in portions of about 25 to 30 grams each, and at such a rate that the temperature did not rise above 250° F. After all of the phosphorus pentasulphide had been added, the temperature was raised to 300° F., and maintained at that temperature for 3 hours, at the end of which period all of the sulphide was dissolved. Thereafter, the mixture was cooled to 250° F. and 306 grams of normal hexyl alcohol was added and the temperature of the mixture held at about 200° F. for 1 hour.

The product was found by analysis to have an acid number of 74.0 and a saponification number of 172.1 and to contain 8.20% phosphorus and 21.57% sulphur by weight.

Example V 680 grams (5 moles) of steam-distilled wood turpentine was placed in a 3-liter flask, such as previously described, and heated to 225° F. There was then added 444 grams (2 moles) of powdered phosphorus pentasulphide, in 25 to 30 gram portions, at such a rate as to hold the temperature below 250° F. No external heat was applied during this addition. When all of the phosphorus pentasulphide was added, the mixture was heated to 300° F. and maintained at this temperature for 3 hours, at the end of which period the phosphorus pentasulphide had dissolved. The mixture was then cooled to 250° F., and 306 grams (3 moles) of 2-ethyl butanol-1 was added over a period of 30 minutes with continuous stirring. The temperature was held at about 200 to 220° F. for 1 hour after the addition of the alcohol.

The product was found by analysis to have an acid number of 74.9 and a saponification number of 176.2 and to contain 8.96% phosphorus and 22.1% sulphur by weight.

Example VI 340 grams (2.5 moles) of turpentine was heated to 200° F. and 222 grams (1 mole) of powdered phosphorus pentasulphide was added slowly as previously described. After the phosphorus pentasulphide was all dissolved, 279 grams (1.5 moles) of "Lorol," a commercial mixture of alcohols made from hydrogenated fatty acid esters from palm oil and containing from 10 to 14 carbon atoms per molecule, was added and the mixture maintained for 1 hour at a temperature of 220° F.

The product was found by analysis to have an acid number of 67.2 and a saponification number of 147.3 and to contain 7.18% phosphorus and 19.80% sulphur by weight.

*Example VII*

To a turpentine-P$_2$S$_5$ condensation product prepared as in Example VI, there was added 405 grams (1.5 moles) of octadecyl alcohol and the mixture maintained at 220° F. for 1 hour. The product was found by analysis to have an acid number of 57.2 and a saponification number of 131.6 and to contain 6.52% phosphorus and 17.20% sulphur by weight.

*Example VIII*

In a 3-liter flask, such as used in Example I, 1360 grams (10 moles) of turpentine was placed and heated to 200° F. 888 grams (4 moles) of powdered phorphorus pentasulphide was then slowly added to the heated turpentine under conditions described in Example I. After the phosphorus pentasulphide was dissolved, 1300 grams (10 moles) of capryl alcohol (octanol-2) was added and the mixture stirred and heated as in Example I. The product was found by analysis to have an acid number of 114.2 and a saponification number of 146.9 and to contain 7.09% phosphorus and 17.4% sulphur, by weight.

*Example IX*

The procedure of Example VII was repeated, substituting methyl alcohol for the capryl alcohol and the product was found by analysis to have an acid number of 100.8 and a saponification number of 213.9 and to contain 10.9% phosphorus and 26.5% sulphur, by weight.

As previously indicated, the characteristics of my new class of compounds are influenced by the alcohol used in their production. Aliphatic alcohols generally have been found suitable for this purpose. For example, aliphatic alcohols ranging from methyl to octadecyl alcohol, i. e., containing from 1 to 18 carbon atoms per molecule, including secondary alcohols of 5 to 8 carbon atoms and branched chain primary alcohols containing 5 to 6 carbon atoms, have been used with advantage. Products having particularly desirable characteristics, especially as constituents of lubricating oil compositions, have been obtained by the use of capryl alcohol (octanol-2). Also, normal hexyl alcohol and lauryl alcohol have been used with exceptional advantage in the preparation of products for such purposes. Generally, aliphatic alcohols having 5 or more carbon atoms per molecule are preferred.

The turpentine-P$_2$S$_5$ condensation product from which the members of my new class of compounds are prepared is, in the absence of excess turpentine, normally a brittle, resinous solid. It is with advantage prepared from turpentine, either steam-distilled wood turpentine or gum spirits, consisting mainly of alpha pinene, a bi-cyclic terpene having the empirical formula $C_{10}H_{16}$. Pure alpha pinene and other more costly terpenes will react similarly with P$_2$S$_5$ but, for reasons including economic considerations, I prefer to use the more readily available turpentines. The turpentine used in the specific examples herein was a technical grade steam-distilled wood turpentine comprising about 90% alpha pinene.

I claim:

1. The product resulting from the reaction of an aliphatic alcohol with a condensation product of turpentine and phosphorus pentasulphide.

2. The product resulting from the reaction of an aliphatic alcohol, of not less than 5 carbon atoms per molecule, with a condensation product of turpentine and phosphorus pentasulphide.

3. The product resulting from the reaction of capryl alcohol with a condensation product of turpentine and phosphorus pentasulphide.

4. The product resulting from the reaction of normal hexyl alcohol with a condensation product of turpentine and phosphorus pentasulphide.

5. The product resulting from the reaction of lauryl alcohol with a condensation product of turpentine and phosphorus pentasulphide.

ROBERT L. MAY.

---

CERTIFICATE OF CORRECTION.

Patent No. 2,356,073.  August 15, 1944.

ROBERT L. MAY.

It is hereby certified that error appears in the printed specification of the above numbered patent requiring correction as follows: Page 3, first column, line 39, for "Example VII" read --Example VIII--; and that the said Letters Patent should be read with this correction therein that the same may conform to the record of the case in the Patent Office.

Signed and sealed this 31st day of October, A. D. 1944.

Leslie Frazer

Acting Commissioner of Patents.

(Seal)

phorus pentasulphide was all dissolved, 279 grams (1.5 moles) of "Lorol," a commercial mixture of alcohols made from hydrogenated fatty acid esters from palm oil and containing from 10 to 14 carbon atoms per molecule, was added and the mixture maintained for 1 hour at a temperature of 220° F.

The product was found by analysis to have an acid number of 67.2 and a saponification number of 147.3 and to contain 7.18% phosphorus and 19.80% sulphur by weight.

Example VII

To a turpentine-$P_2S_5$ condensation product prepared as in Example VI, there was added 405 grams (1.5 moles) of octadecyl alcohol and the mixture maintained at 220° F. for 1 hour. The product was found by analysis to have an acid number of 57.2 and a saponification number of 131.6 and to contain 6.52% phosphorus and 17.20% sulphur by weight.

Example VIII

In a 3-liter flask, such as used in Example I, 1360 grams (10 moles) of turpentine was placed and heated to 200° F. 888 grams (4 moles) of powdered phorphorus pentasulphide was then slowly added to the heated turpentine under conditions described in Example I. After the phosphorus pentasulphide was dissolved, 1300 grams (10 moles) of capryl alcohol (octanol-2) was added and the mixture stirred and heated as in Example I. The product was found by analysis to have an acid number of 114.2 and a saponification number of 146.9 and to contain 7.09% phosphorus and 17.4% sulphur, by weight.

Example IX

The procedure of Example VII was repeated, substituting methyl alcohol for the capryl alcohol and the product was found by analysis to have an acid number of 100.8 and a saponification number of 213.9 and to contain 10.9% phosphorus and 26.5% sulphur, by weight.

As previously indicated, the characteristics of my new class of compounds are influenced by the alcohol used in their production. Aliphatic alcohols generally have been found suitable for this purpose. For example, aliphatic alcohols ranging from methyl to octadecyl alcohol, i. e., containing from 1 to 18 carbon atoms per molecule, including secondary alcohols of 5 to 8 carbon atoms and branched chain primary alcohols containing 5 to 6 carbon atoms, have been used with advantage. Products having particularly desirable characteristics, especially as constituents of lubricating oil compositions, have been obtained by the use of capryl alcohol (octanol-2). Also, normal hexyl alcohol and lauryl alcohol have been used with exceptional advantage in the preparation of products for such purposes. Generally, aliphatic alcohols having 5 or more carbon atoms per molecule are preferred.

The turpentine-$P_2S_5$ condensation product from which the members of my new class of compounds are prepared is, in the absence of excess turpentine, normally a brittle, resinous solid. It is with advantage prepared from turpentine, either steam-distilled wood turpentine or gum spirits, consisting mainly of alpha pinene, a bi-cyclic terpene having the empirical formula $C_{10}H_{16}$. Pure alpha pinene and other more costly terpenes will react similarly with $P_2S_5$ but, for reasons including economic considerations, I prefer to use the more readily available turpentines. The turpentine used in the specific examples herein was a technical grade steam-distilled wood turpentine comprising about 90% alpha pinene.

I claim:

1. The product resulting from the reaction of an aliphatic alcohol with a condensation product of turpentine and phosphorus pentasulphide.

2. The product resulting from the reaction of an aliphatic alcohol, of not less than 5 carbon atoms per molecule, with a condensation product of turpentine and phosphorus pentasulphide.

3. The product resulting from the reaction of capryl alcohol with a condensation product of turpentine and phosphorus pentasulphide.

4. The product resulting from the reaction of normal hexyl alcohol with a condensation product of turpentine and phosphorus pentasulphide.

5. The product resulting from the reaction of lauryl alcohol with a condensation product of turpentine and phosphorus pentasulphide.

ROBERT L. MAY.

---

CERTIFICATE OF CORRECTION.

Patent No. 2,356,073.

August 15, 1944.

ROBERT L. MAY.

It is hereby certified that error appears in the printed specification of the above numbered patent requiring correction as follows: Page 3, first column, line 39, for "Example VII" read --Example VIII--; and that the said Letters Patent should be read with this correction therein that the same may conform to the record of the case in the Patent Office.

Signed and sealed this 31st day of October, A. D. 1944.

Leslie Frazer

Acting Commissioner of Patents.

(Seal)